INVENTOR
H. B. SCHULTHEIS JR
BY
ATTORNEY

Patented Mar. 13, 1951

2,545,007

UNITED STATES PATENT OFFICE 2,545,007

REGENERATIVE ELECTROMECHANICAL TRANSDUCER

Harry B. Schultheis, Jr., Pacoima, Calif., assignor to Bendix Aviation Corporation, South Bend, Ind., a corporation of Delaware Application June 1, 1948, Serial No. 30,318

3 Claims. (Cl. 323—75)

This invention relates to transducers for producing mechanical motion in response to and corresponding to varying electric currents, and its general object is to provide such a transducer of increased sensitivity whereby it is responsive to weaker currents, and whereby the use of current amplifiers can be reduced or dispensed with.

This object is achieved in accordance with the invention by securing to the movable element of the transducer one or more strain gauge resistance elements which change their resistance in response to movement, and by so connecting these elements to the input circuit of the transducer that the change in resistance of the elements produced by a given movement of the transducer increases the current applied to the transducer thereby effecting a further displacement of the movable element of the transducer. The input circuit may include a bridge having the strain gauge resistance elements in opposing arms thereof, so that any initial slight movement of the transducer varies the resistance of the strain gauge elements, which unbalances the bridge and increases the current to the transducer. Sometimes, variations in resistance are to be measured, in which case, the variable resistance to be measured can be placed in another arm of the bridge. In other instances, variations in potential are to be measured, under which conditions the sources of potential may be connected to the transducer in parallel with the output of the bridge. In still other instances the object may be to measure a current, under which condition the source of current may be connected to the transducer in series with the output of the bridge.

A full understanding of the invention may be had from the following detailed description with reference to the drawing, in which.

Figure 1:
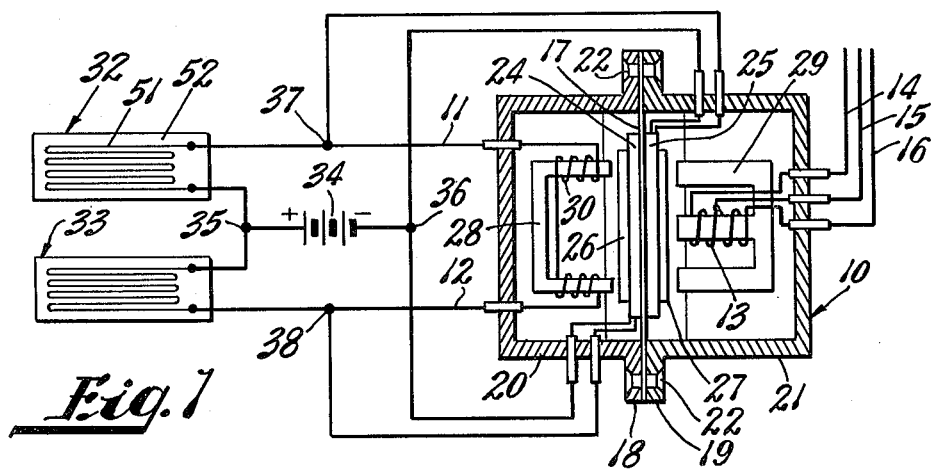
Fig. 1 is a schematic diagram of a system in accordance with the invention.

Referring first to Fig. 1, there is shown a transducer 10, which is of a type employed in telemetering. It has a pair of input leads 11 and 12 respectively which supply a varying current which is to be measured, and has an inductive winding or coil 13, the inductance of which is varied in accordance with the input currents. The particular transducer illustrated is for use in a telemetering system in which the winding 13 constitutes a frequency determining element of an electric oscillator, so that variations in the inductance of the winding 13 vary the frequency of the current generated by the oscillator. Hence, the winding 13 is shown having three output leads 14, 15 and 16 respectively which are extended to an oscillator unit (not shown).

The transducer 10 comprises a diaphragm 17 which is clamped at its edges between flanges 18 and 19 of two similar casing elements 20 and 21, the flanges of the sections 20 and 21 being secured together as by rivets 22.

In accordance with the present invention, there are secured to the diaphragm 17, on opposite sides thereof, a pair of strain gauge resistance elements 24 and 25 respectively. Such gauges are well-known and consist of a length of fine wire 51 (referring to the gauge 32, which is similar) cemented to a piece of paper or the like 52, so that the wire stretches or contracts with the paper. When the wire is stretched, the resistance thereof is increased, and when it is contracted its resistance is decreased. In their ordinary use, such strain gauges are cemented or otherwise bonded to the surface of an article that is to be distorted. In the present instance, the diaphragm 17 constitutes such a distortable article.

Also secured to the diaphragm 17 (shown mounted on top of the strain gauges 24 and 25, respectively) are a pair of armature elements 26 and 27 respectively, which cooperate with paramagnetic cores 28 and 29 respectively. The core 28 has a winding 30 thereon which is connected to the input leads 11 and 12, so that current applied to the leads 11 and 12 magnetizes the core 28 and attracts the armature 26 thereby distorting the diaphragm 17 and the strain gauge elements 24 and 25 in one direction. Such movement carries the armature 27 away from the core 29, thereby reducing the inductance of the winding 13, which would increase the frequency of the oscillator to which it is connected.

The strain gauge resistance elements 24 and 25 are connected in a bridge circuit with two other strain gauges 32 and 33 respectively. A battery 34, or other source of current, is connected across one pair of diagonal points 35 and 36 of the bridge, and the transducer inlet leads 11 and 12 are connected across the other diagonal points 37 and 38 of the bridge.

In the arrangement of Fig. 1, the quantity that is to be measured is the resistance of the strain gauge element 32, which may be mounted on some object that is strained, such as the wing surface of an aircraft.

Figure 2:
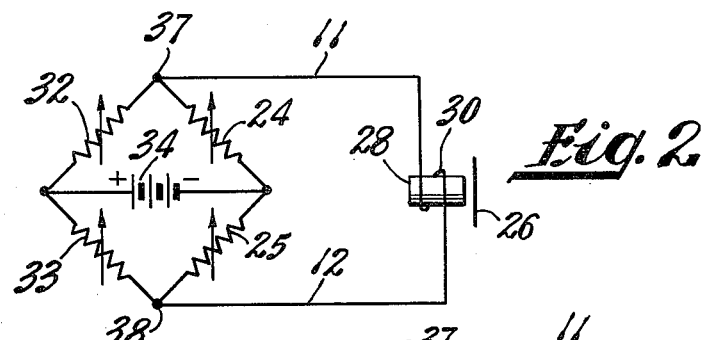
Fig. 2 is a schematic circuit diagram of the system shown in Fig. 1.

Referring to Figs. 1 and 2, the other strain gauge 33, which is positioned in an arm of the bridge adjacent to the gauge 32, is of equal resistance and is mounted close to the gauge 32 but not subject to strain. It provides compensation for variations of resistance of the strain gauge 32 produced by changes in temperature. On the other hand, the strain gauges 24 and 25, in the other two arms of the bridge, are strained in response to deflection of the diaphragm 17, and are so connected in the bridge circuit that they increase any unbalance therein, thereby augmenting or amplifying the deflection of the diaphragm 17.

Thus for instance, let it be assumed that the strain gauge 32 is strained in such a way as to reduce its resistance, thereby causing the diagonal point 37 of the bridge to become positive with respect to the diagonal point 38. Let it be assumed that the resultant current through the winding 30 of the transducer increases the attraction of the core 28 for the armature 26, thereby bending the diaphragm to the left. This movement stretches the strain gauge 24 and contracts the strain gauge 25, causing the strain gauge 24 to increase its resistance, and causing the gauge 25 to decrease its resistance. This further increases the unbalance of the bridge, thereby rendering the diagonal point 37 more positive with respect to the diagonal point 38, and increasing the current applied to the transducer winding 30, thereby substantially increasing the deflection of the diaphragm 17 to the left over what it would have been had the strain gauges 24 and 25 been replaced, in the bridge, by the usual fixed resistors.

It is possible to so increase the sensitivity of the transducer as to cause it to oscillate continuously, and there may be situations in which such an oscillator would have utility. Ordinarily, for the use illustrated in Fig. 1, the sensitivity is kept below the oscillating point.

Figure 3:
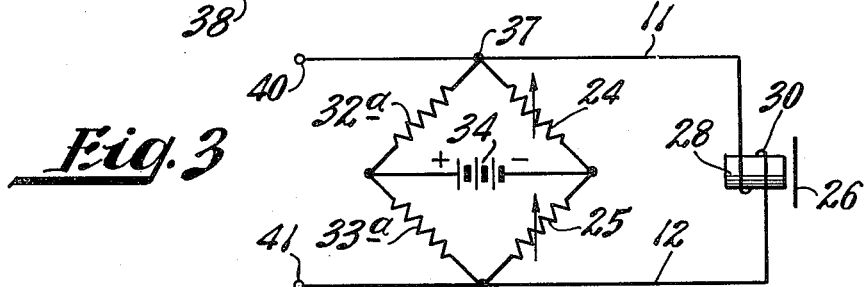
Fig. 3 is a schematic circuit diagram modified for the measurement of potential.

Fig. 3 shows the use of the circuit for measuring a potential instead of a change of resistance. The circuit in this case is identical with that of Figs. 1 and 2 except that the strain gauge resistances 32 and 33 have been replaced by fixed resistors 32a and 33a, and the source of potential to be measured is connected to terminals 40 and 41 which are connected to the diagonal points 37 and 38 of the bridge.

Figure 4:
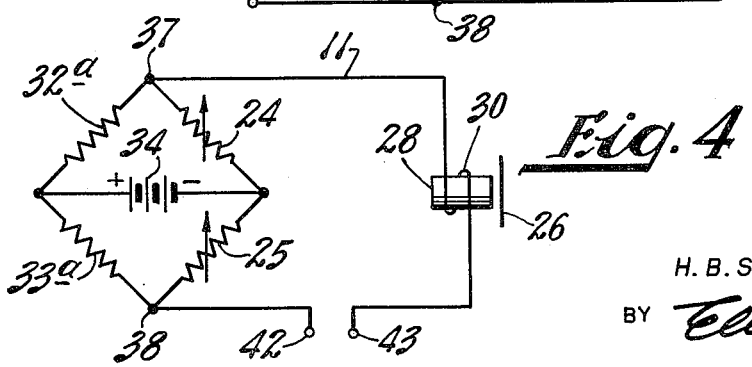
Fig. 4 is a schematic circuit diagram similar to Fig. 2 but modified for the measurement of current.

The circuit of Fig. 4 is identical with that of Fig. 3 except that the terminals 40 and 41 are eliminated and a pair of terminals 42 and 43 are provided in series between the diagonal points 37 and 38 of the bridge and the transducer coil 30. This is the preferred arrangement where a current is to be measured rather than a potential.

Although for the purpose of explaining the invention, a particular embodiment thereof has been shown and described, obvious modifications will occur to a person skilled in the art, and I do not desire to be limited to the exact details shown and described.

I claim:

1. In combination, an electro-mechanical transducer having a mechanical element distortable in response to application of electric current to said transducer; a strain-responsive impedance device so associated with said mechanical element that distortion of the element strains said device to vary its impedance, and means responsive to said variation in impedance for applying to said transducer a current that increases the distortion of said element, said impedance device comprising a pair of strain-responsive elements oppositely mounted on said mechanical element whereby they are oppositely strained in response to any given distortion of said mechanical element, and said means comprises a Wheatstone bridge having said strain-responsive elements connected in opposing arms thereof.

2. The combination according to claim 1 including a variable impedance for primary control of said transducer, said variable impedance being connected in another arm of said bridge.

3. The combination according to claim 1 in which said distortable mechanical element comprises a diaphragm supported at the edges, and said strain-responsive impedance elements comprise strain gauges secured to opposite faces of said diaphragm whereby one of said gauges is contracted and the other expanded, in response to flexure of said diaphragm in one direction, and the one gauge is expanded and the other gauge is contracted in response to flexure of the diaphragm in the opposite direction.

HARRY D. SCHULTHEIS, JR.

REFERENCES CITED

The following references are of record in the file of this patent:

UNITED STATES PATENTS

| Number | Name | Date |
|---|---|---|
| 1,525,182 | Hayes | Feb. 3, 1925 |
| 1,775,752 | Edwards | Sept. 16, 1930 |
| 2,386,657 | Carstarphen | Oct. 9, 1945 |